I. CHAPMAN.
POT AND KETTLE COVER.
APPLICATION FILED JAN. 30, 1909.
939,802.
Patented Nov. 9, 1909.
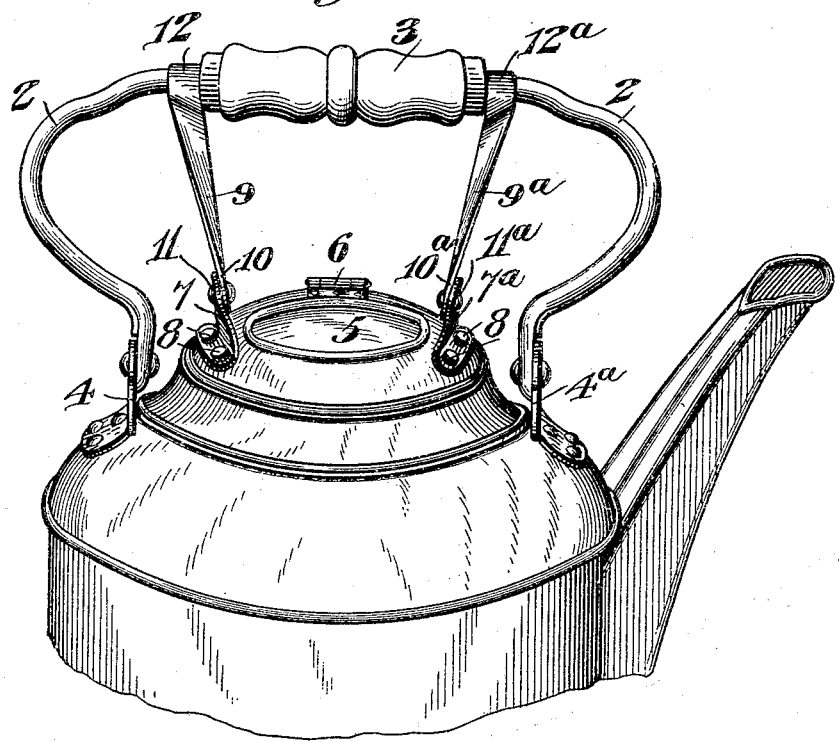
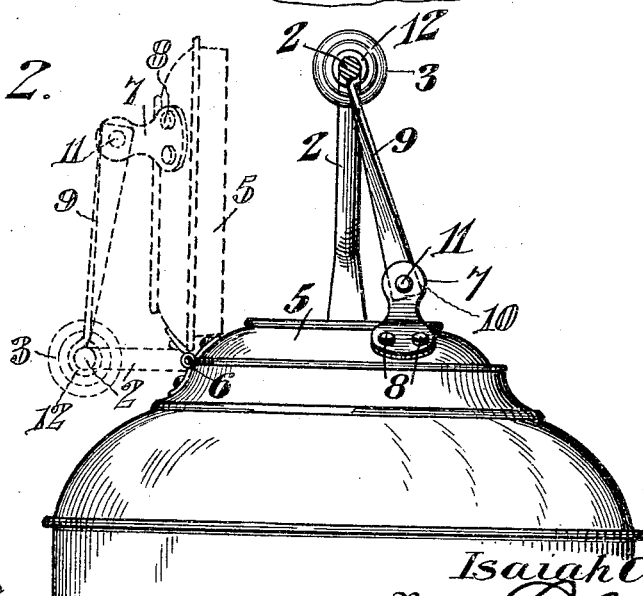
Witnesses
Jas. F. M'Cathran
George Tate
Inventor
Isaiah Chapman,
By C. G. Siggers
Attorney

UNITED STATES PATENT OFFICE.

ISAIAH CHAPMAN, OF ECKELSON, NORTH DAKOTA, ASSIGNOR OF ONE-HALF TO PETER E. KNUDSEN, OF ECKELSON, NORTH DAKOTA.

POT AND KETTLE COVER.

939,802. Specification of Letters Patent. Patented Nov. 9, 1909.

Application filed January 30, 1909. Serial No. 475,139.

*To all whom it may concern:*

Be it known that I, ISAIAH CHAPMAN, a citizen of the United States, residing at Eckelson, in the county of Barnes and State of North Dakota, have invented a new and useful Pot and Kettle Cover, of which the following is a specification.

This invention relates to an improved means for operating the lid of a kettle, or other receptacle, by movement of the handle, and has for its object to provide a device of this character which will permit of the operator to easily and quickly grasp the handle of said receptacle whenever desirous of either handling the same or operating the lid thereof.

The invention comprises a receptacle having a hinged lid or cover, a bail pivoted to the receptacle, a hand grip arranged on the bail, and spaced link members respectively hinged to the bail at each end of the hand grip and pivoted to the hinged lid at places in alinement with, but to one side of the central line of the receptacle, and in close proximity to pivotal bearings of the bail.

In the drawings: Figure 1. is a perspective view of a kettle showing my invention applied thereto. Fig. 2. is an end elevation of the same.

Like numerals of reference designate corresponding parts in all the figures of the drawings.

Referring to the drawings 1 designates a kettle or other receptacle having a bail 2 on which is arranged a hand grip 3 in the usual manner. The bail is pivoted to upstanding ears 4—4ª which are respectively secured to the receptacle at opposite sides of a lid 5 and in alinement with the center of said receptacle. The lid 5 is pivotally secured to the receptacle by a hinge 6 which is located in a plane at right angles to the plane of the bail-ears 4—4ª. The lid is further provided with upstanding ears 7—7ª which are secured to the lid by rivets 8—8 or other suitable fastening means, and are respectively arranged on the side of the lid opposite to the hinge 6 and on opposite sides of a line drawn transversely across the receptacle and intersecting the hinge of the lid. Furthermore these ears 7—7ª are arranged at an angle with respect to the bail and in a plane parallel with the plane of the bail-ears 4—4ª and also in close proximity thereto. The invention further embodies two link members 9—9ª which are preferably formed of a strip of flat metal. The lower ends 10—10ª of the said members are respectively pivoted to the ears 7—7ª of the lid 5 by suitable bearings 11—11ª. The body portions of the members are given a quarter turn or twist, and the upper ends thereof are formed into loops 12—12ª which are respectively secured to the bail 2 at either end of the hand grip 3. Furthermore, these link members 9—9ª are of such a length that when the lid 5 is in a closed position the bail 2 will be held erect, as clearly illustrated in the drawings. It will be also apparent that by swinging the bail toward the hinge 6 of the lid 5, the link members 9—9ª being pivotally secured to the bail and to the lid, the said lid will be caused to open. Furthermore, by arranging the pivotal bearings or ears 7—7ª of the link members 9—9ª in a spaced relation relieves the bail of any obstruction and permits the hand of the operator to easily and quickly grasp the hand grip 3 whenever the receptacle is desired to be moved, or the lid thereof opened. This arrangement not only insures an even pull on both sides of the lid by the link members and thereby prevents any tendency of the lid to wabble when being opened, but also causes the lid to be firmly closed, as the bearings 7—7ª are arranged in close proximity to the ears 4—4ª of the bail, which will consequently create a more solid pressure on each side of the lid.

I claim:

1. In combination with a receptacle having diametrically opposite arranged ears secured thereon, and a bail pivotally secured to the ears and provided with a hand grip, of a cover for the receptacle arranged between the bail ears and secured to said receptacle by a hinge that is located in a plane at right angles to the plane of the bail-ears, spaced ears secured to the cover and arranged thereon opposite to the hinge and in a plane substantially parallel with the plane of the bail-ears and in close proximity thereto, and link members respectively pivoted to the bail at either end of the hand-grip and to the spaced ears of the cover.

2. In combination with a receptacle having diametrically opposite arranged ears secured thereon, and a bail pivotally secured to the ears and provided with a hand-grip, of a cover for the receptacle arranged between the bail ears and secured to said receptacle by a hinge that is located in a plane at right angles to the plane of the bail-ears, spaced ears secured to the cover and arranged thereon opposite to the hinge and in a plane substantially parallel with the plane of the bail-ears and in close proximity thereto, said ears being arranged at an angle to the plane of the bail, and link members formed of strips of sheet metal and having the lower ends pivotally secured to the spaced ears on the cover and their body portions given a quarter turn or twist, the upper ends thereof being bent around the bail at either end of the hand-grip to form pivotal connections therewith.

In testimony, that I claim the foregoing as my own, I have hereto affixed my signature in the presence of two witnesses.

ISAIAH CHAPMAN.

Witnesses:
    HARVEY GAINSFORTH,
    H. C. FOX.